US010675856B2

(12) United States Patent
FrantzDale

(10) Patent No.: US 10,675,856 B2
(45) Date of Patent: Jun. 9, 2020

(54) SYSTEMS AND METHODS OF FLEXIBLE SUBSTRATES FOR ADDITIVE FABRICATION

(71) Applicant: Formlabs, Inc., Somerville, MA (US)

(72) Inventor: Ben FrantzDale, Harvard, MA (US)

(73) Assignee: Formlabs, Inc., Somerville, MA (US)

( * ) Notice: Subject to any disclaimer, the term of this patent is extended or adjusted under 35 U.S.C. 154(b) by 246 days.

(21) Appl. No.: 15/388,041

(22) Filed: Dec. 22, 2016

(65) Prior Publication Data

US 2017/0197363 A1 Jul. 13, 2017

Related U.S. Application Data

(60) Provisional application No. 62/274,014, filed on Dec. 31, 2015.

(51) Int. Cl.
*B29C 67/00* (2017.01)
*B33Y 10/00* (2015.01)
*B33Y 30/00* (2015.01)
*B33Y 70/00* (2020.01)
*B29C 64/245* (2017.01)
*B29C 64/135* (2017.01)
(Continued)

(52) U.S. Cl.
CPC ............ *B33Y 30/00* (2014.12); *B29C 64/135* (2017.08); *B29C 64/245* (2017.08); *B29C 64/255* (2017.08); *B33Y 10/00* (2014.12); *B29K 2083/00* (2013.01); *B29K 2105/128* (2013.01); *B29K 2309/08* (2013.01)

(58) Field of Classification Search
CPC ... B29C 64/124; B29C 64/129; B29C 64/135; B29C 64/245; B33Y 10/00; B33Y 30/00
See application file for complete search history.

(56) References Cited

U.S. PATENT DOCUMENTS 2,311,613 A 2/1943 Slayter
5,545,367 A 8/1996 Bae et al.
(Continued)

FOREIGN PATENT DOCUMENTS

CN 104760291 A 7/2015
CN 105014974 A 11/2015
(Continued)

OTHER PUBLICATIONS

Little (Little, Jessamyn R.L., "Tunable and High Refractive Index Polydimethylsiloxane Polymers for Label-Free Optical Sensing" Queens University, Kingston, Ontario Canada, Aug. 2013).*
(Continued)

*Primary Examiner* — Jason L Lazorcik
(74) *Attorney, Agent, or Firm* — Wolf, Greenfield & Sacks, P.C.

(57) ABSTRACT

According to some aspects, a method of additive fabrication is provided wherein a plurality of layers of material are formed on a build platform, the method comprising forming a layer of material in contact with a substrate and further in contact with either a previously formed layer of material or the build platform, the substrate being an actinically transparent, flexible, composite material, and subsequent to the forming of the layer of the material, actively separating the layer of material from the substrate.

19 Claims, 7 Drawing Sheets

(51) Int. Cl.
*B29C 64/255* (2017.01)
*B29K 83/00* (2006.01)
*B29K 105/12* (2006.01)
*B29K 309/08* (2006.01)

(56) References Cited

U.S. PATENT DOCUMENTS

| | | | | |
|---|---|---|---|---|
| 8,877,115 | B2* | 11/2014 | Elsey | B29C 35/0805 |
| | | | | 264/401 |
| 2004/0149127 | A1 | 8/2004 | Lyons et al. | |
| 2006/0147693 | A1 | 7/2006 | Przybylinski et al. | |
| 2013/0001834 | A1 | 1/2013 | El-Siblani et al. | |
| 2013/0292862 | A1* | 11/2013 | Joyce | B29C 64/35 |
| | | | | 264/40.1 |
| 2014/0030522 | A1* | 1/2014 | Choiniere | B29C 70/06 |
| | | | | 428/394 |
| 2015/0151489 | A1 | 6/2015 | Elsey | |
| 2015/0352788 | A1* | 12/2015 | Livingston | B65D 11/20 |
| | | | | 264/401 |
| 2016/0177247 | A1 | 6/2016 | Clark et al. | |
| 2016/0193786 | A1 | 7/2016 | Moore et al. | |
| 2016/0303795 | A1 | 10/2016 | Liu et al. | |
| 2017/0072627 | A1 | 3/2017 | Li | |
| 2017/0246796 | A1 | 8/2017 | Bauer et al. | |
| 2018/0071976 | A1* | 3/2018 | Tumbleston | B33Y 10/00 |
| 2018/0071977 | A1* | 3/2018 | Tumbleston | B33Y 30/00 |
| 2018/0126644 | A1 | 5/2018 | Slaczka et al. | |
| 2018/0264724 | A1* | 9/2018 | Feller | B29C 64/245 |

FOREIGN PATENT DOCUMENTS

| | | |
|---|---|---|
| CN | 105122136 A | 12/2015 |
| WO | WO 2015-195920 A1 | 12/2015 |

OTHER PUBLICATIONS

International Search Report and Written Opinion for International Application No. PCT/US2016/068318 dated Feb. 28, 2017.
International Search Report and Written Opinion for International Application No. PCT/US2017/060679 dated Jan. 12, 2018.
International Preliminary Report on Patentability for International Application No. PCT/US2016/068318 dated Jul. 12, 2018.
Chinese communication in connection with Chinese Application No. 201680080894.7 dated Oct. 31, 2019.
Extended European Search Report for Application No. EP 16882428.2 dated Jul. 3, 2019.
International Preliminary Report on Patentability for International Application No. PCT/US2017/060679 dated May 23, 2019.
U.S. Appl. No. 16/404,524, filed May 6, 2019, Slaczka et al.
U.S. Appl. No. 16/427,912, filed May 31, 2019, Frantzdale et al.

* cited by examiner

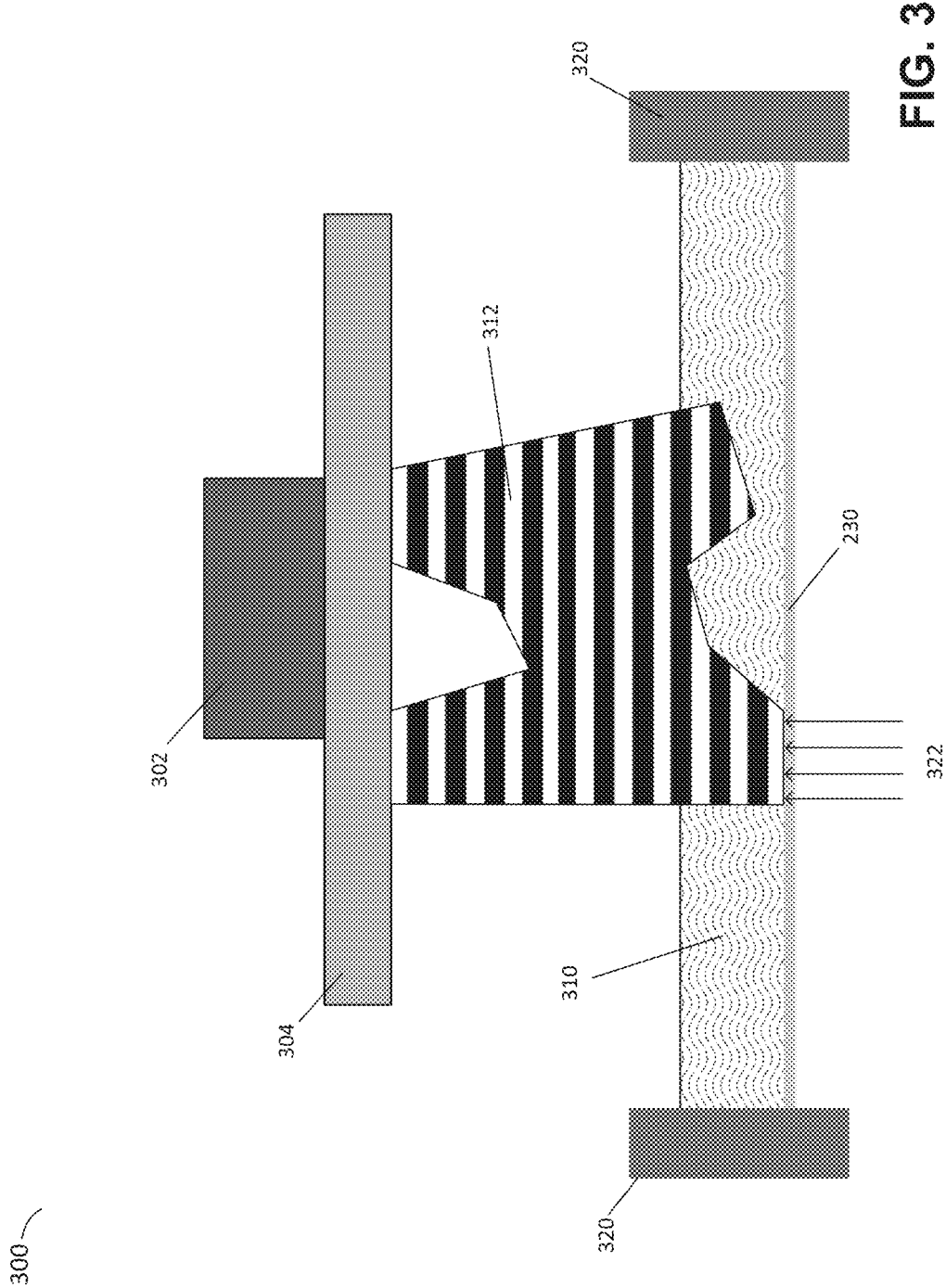

SYSTEMS AND METHODS OF FLEXIBLE SUBSTRATES FOR ADDITIVE FABRICATION

CROSS-REFERENCE TO RELATED APPLICATIONS

The present application claims the benefit under 35 U.S.C. § 119(e) to U.S. Provisional Patent Application No. 62/274,014, filed on Dec. 31, 2015, titled "Systems And Methods Of Flexible Substrates For Additive Fabrication," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable photopolymer resin, typically first onto a substrate and then one on top of another. Exposure to actinic radiation cures a thin layer of liquid photopolymer, which causes it to harden and adhere to previously cured layers or the bottom surface of the build platform.

SUMMARY

According to some aspects, a method of additive fabrication is provided wherein a plurality of layers of material are formed on a build platform, the method comprising forming a layer of material in contact with a substrate and further in contact with either a previously formed layer of material or the build platform, the substrate being an actinically transparent, flexible, composite material, and subsequent to the forming of the layer of the material, actively separating the layer of material from the substrate.

According to some embodiments, the composite material comprises a plurality of materials, each material of the plurality of materials having substantially the same index of refraction.

According to some embodiments, the composite material comprises a first material embedded in a second material and a layer of a third material laminated over the first and second material.

According to some embodiments, the composite material comprises fibers of a first material embedded in a second material.

According to some embodiments, the fibers are nonwoven fiberglass.

According to some embodiments, the second material is polydimethylsiloxane (PDMS).

According to some embodiments, the fibers are predominantly aligned along a first axis that is parallel to a surface of the substrate.

According to some embodiments, the layer of material is formed by curing a liquid photopolymer.

According to some embodiments, the substrate has a thickness of between 50 µm and 200 µm.

According to some embodiments, the substrate is suspended over an opening opposing the build platform.

According to some aspects, an additive fabrication device is provided, the device comprising a build platform coupled to one or more actuators configured to move the build platform in a vertical direction, the build platform having a build surface that is planar in a horizontal direction, a vessel having an interior surface of which at least a portion is formed from an actinically transparent, flexible, composite material, and a source of actinic radiation arranged to direct actinic radiation through the composite material onto the build surface.

According to some embodiments, the additive fabrication device further comprises one or more actuators configured to move the vessel in the horizontal direction.

According to some embodiments, the additive fabrication device further comprises a wiper configured to move across an exterior surface of the vessel whilst contacting the exterior surface, the exterior surface being opposed to the interior surface.

According to some embodiments, the composite material comprises a plurality of materials, each material of the plurality of materials having substantially the same index of refraction.

According to some embodiments, the vessel is coupled to one or more actuators configured to move the vessel in the horizontal direction.

According to some embodiments, the composite material comprises fibers of a first material embedded in a second material.

According to some embodiments, the fibers are nonwoven fiberglass.

According to some embodiments, the second material is polydimethylsiloxane (PDMS).

According to some embodiments, the composite material has a thickness of between 50 µm and 200 µm.

According to some embodiments, the composite material is suspended over an opening opposing the build platform.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. For purposes of clarity, not every component may be labeled in every drawing. In the drawings:

FIG. 3 illustrates a stereolithographic printer having a composite thin film as a contact surface, according to some embodiments.

DETAILED DESCRIPTION

Some additive fabrication techniques include a process in which solid material is formed in contact with a surface (termed herein a "contact surface") whilst also being in contact with previously formed solid material and/or a build surface. In systems employing such techniques, the newly-formed solid material must be separated from the contact surface in order to continue the fabrication process and form additional solid material.

In certain additive fabrication systems that form solid material against a contact surface, the contact surface is part of the interior surface of a vessel that holds a liquid photopolymer, such as a photopolymer resin. Application of actinic radiation may be applied to cure the photopolymer into a solid, which may in some implementations be applied through the contact surface. As such, in some systems the contact surface may be transparent to the actinic radiation to allow application of the radiation to the liquid photopolymer located between the contact surface and either the previously-formed solid material or the build surface.

Figure 1A:
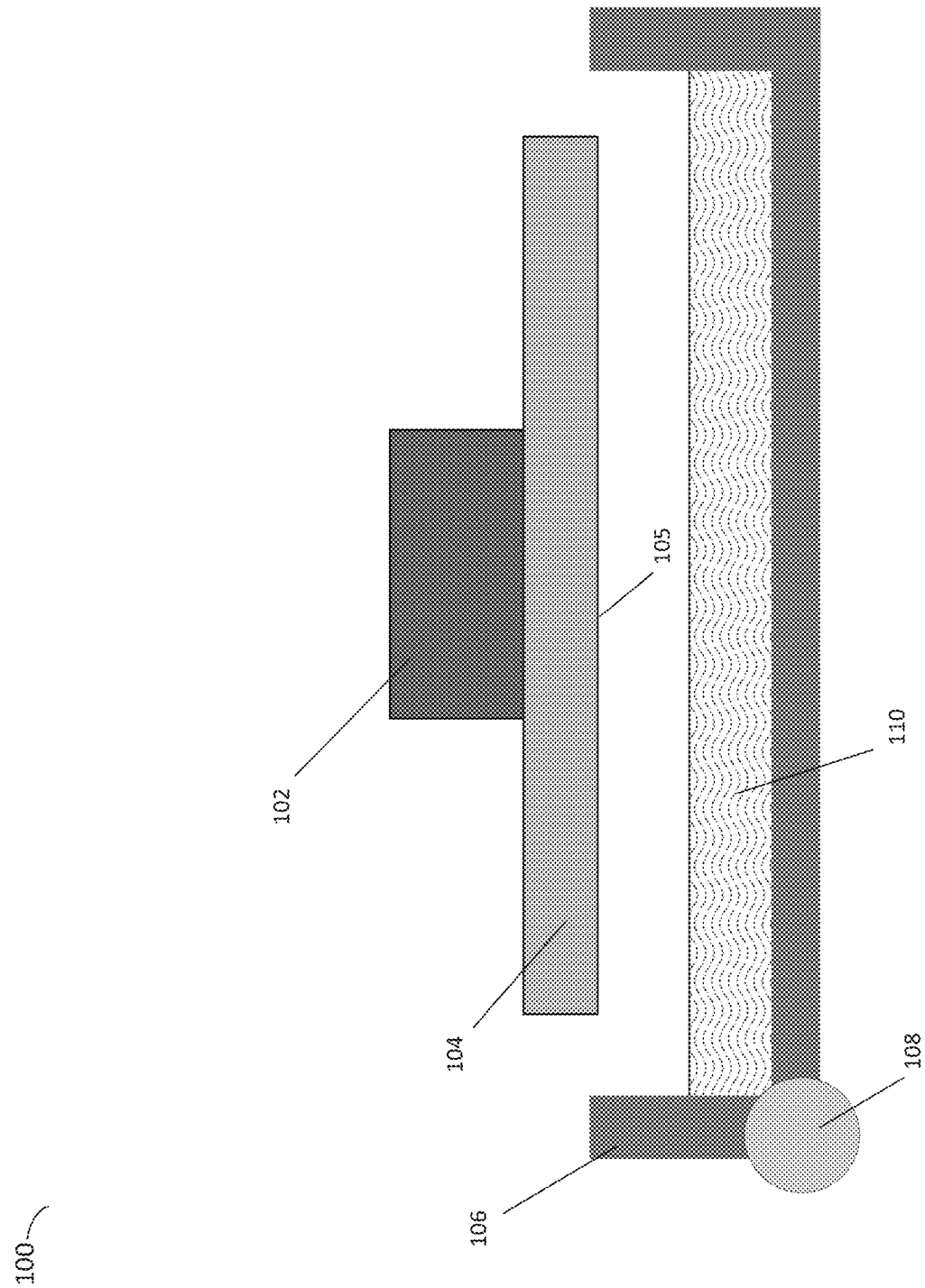
FIG. 1A provides a schematic view of a stereolithographic printer, according to some embodiments.
Figure 1B:
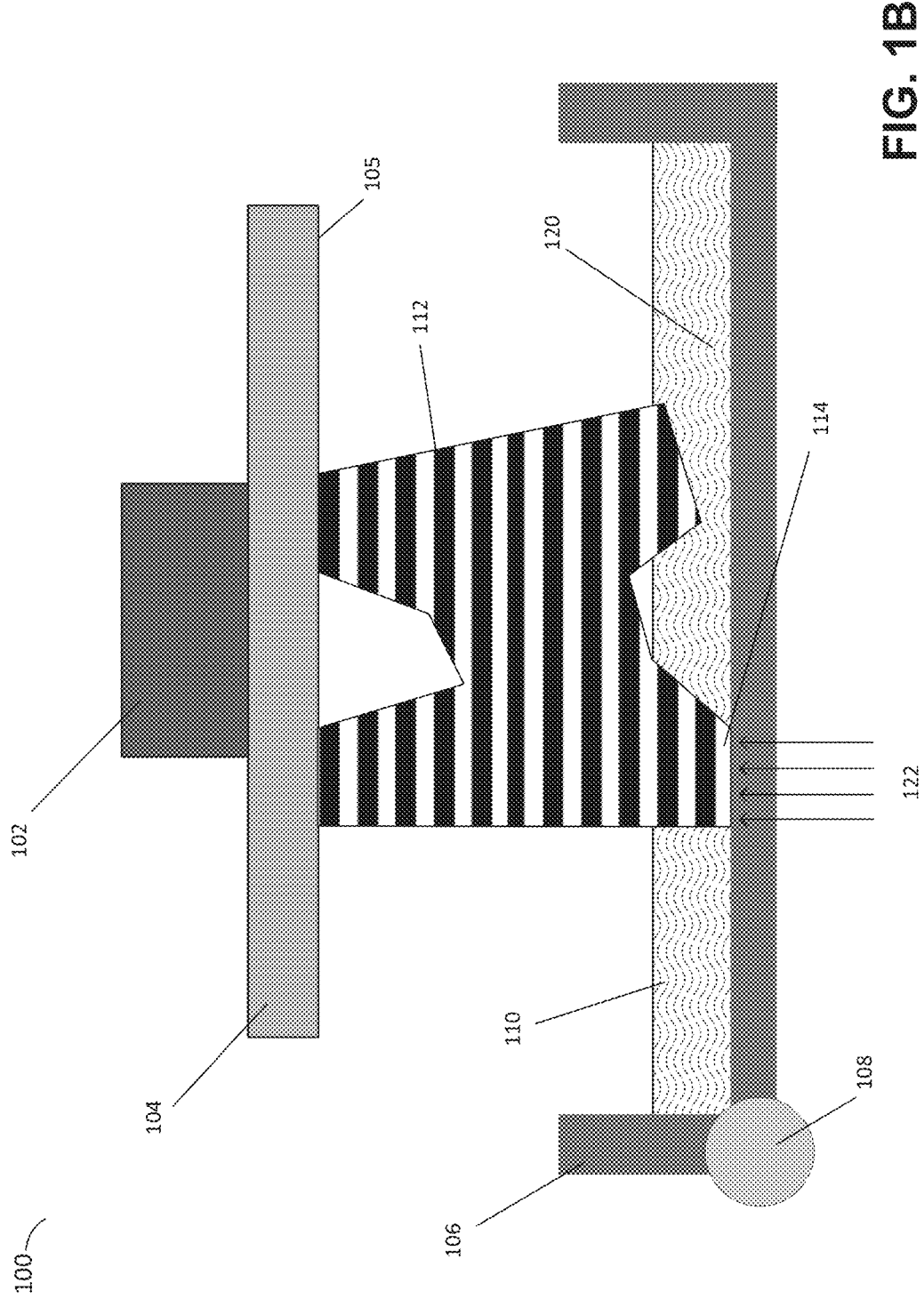
FIG. 1B provides a schematic view of a stereolithographic printer having formed a plurality of layers of a part, according to some embodiments.

To illustrate one exemplary additive fabrication technique in which a part is formed against a contact surface (again, being a surface that cured material contacts other than previously-formed solid material or a build surface), an illustrative inverse stereolithographic printer is depicted in FIGS. 1A and 1B. Illustrative stereolithographic printer 100 is configured to form a part in a downward facing direction on a build platform 105 such that layers of the part are formed in contact with a surface of container 106 in addition to a previously cured layer or the build platform. In the example of FIGS. 1A and 1B, stereolithographic printer 100 comprises build platform 104, container 106, axis 108 and liquid photopolymer 110. A downward facing build platform 104 having a build surface 105 opposes the interior surface (the "floor") of container 106, which contains a photopolymer 110. FIG. 1A represents a configuration of stereolithographic printer 100 prior to formation of any layers of a part on build surface 105.

As shown in FIG. 1B, which represents a subsequent stage of fabrication with respect to FIG. 1A, a part 112 may be formed layerwise, with the initial layer attached to the surface 105 of the build platform 104. At least part of the container's floor may be transparent to actinic radiation 122, which can be targeted at portions of a thin layer of liquid photocurable photopolymer resting on the floor of the container. Exposure to the actinic radiation cures a thin layer of the liquid photopolymer, which causes it to harden. The newly-formed layer of solid material 114 is at least partially in contact with both a previously formed layer and the surface of the container 106 when it is formed.

The top side of the cured photopolymer layer typically bonds to either the bottom surface of the build platform 104 or with the previously cured photopolymer layer in addition to the surface of the container. In order to form additional layers of the part subsequent to the formation of layer 114, any bonding that occurs between the container and the layer must be broken. For example, one or more portions of the surface (or the entire surface) of layer 114 may adhere to the container such that the adhesion must be removed prior to formation of a subsequent layer.

"Separation" of a part from a surface, as used herein, refers to the substantial mitigation of adhesive and/or suction (vacuum) forces connecting the part to the surface. Adhesive forces may be produced, for example, by chemical bonds between cured material and the surface. Suction forces may be produced, for example, by the forces resisting the flow of liquid in between the cured material and the surface. Irrespective of which forces connect the part to the surface, it may be appreciated that, as used herein, a part and a surface may be separated, though immediately subsequent to the separation may nonetheless still be in contact with one another (e.g., at an edge and/or corner) so long as there are no longer forces that connect them to one another. It will also be appreciated that de minimis forces between a part and a contact surface may also exist after separation (e.g., de minimis suction forces may be exhibited even though some liquid has passed between the part and the surface).

Figure 1C:
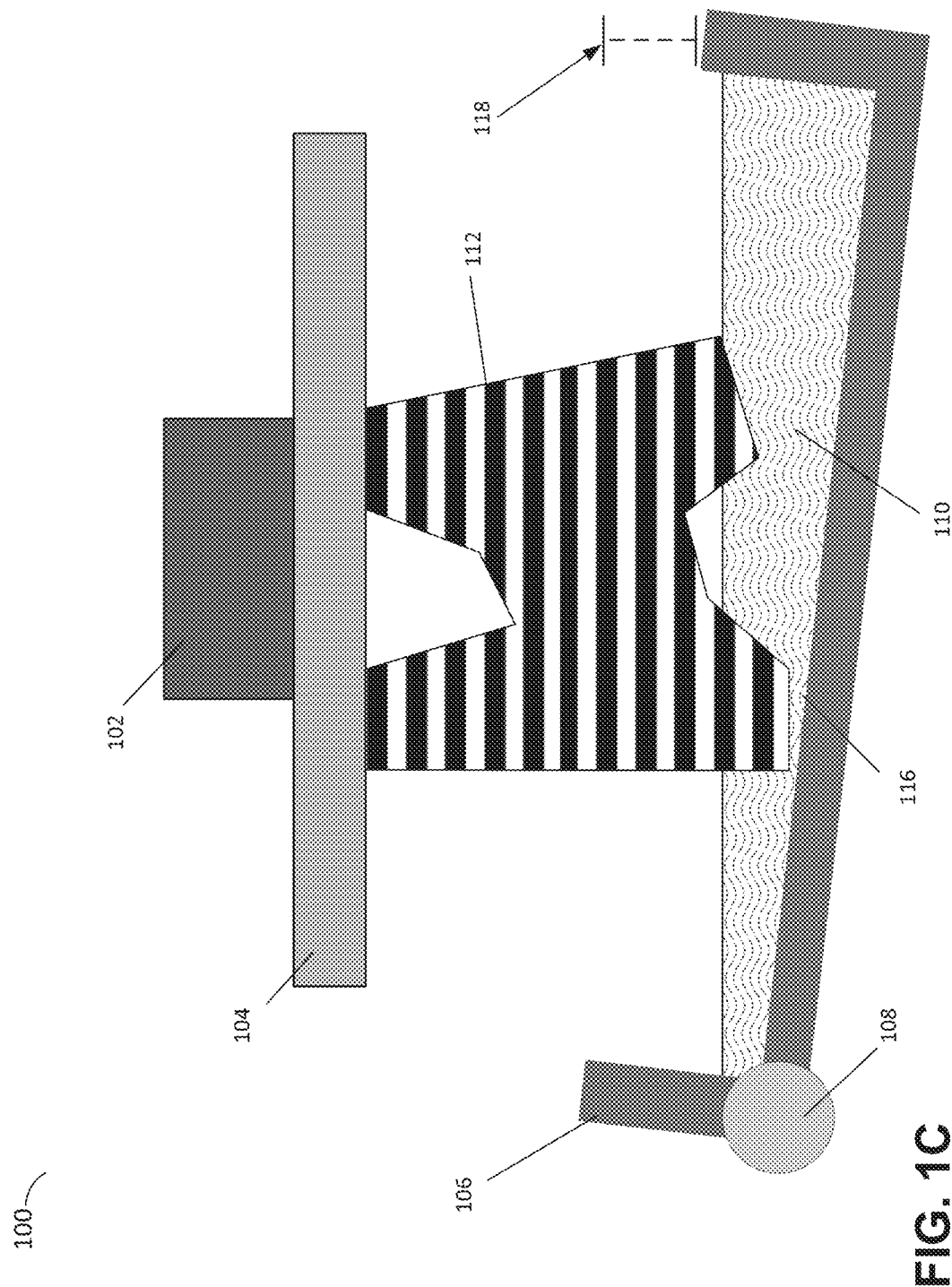
FIG. 1C illustrates a mechanical operation for separating a part from a surface of a stereolithographic printer, according to some embodiments.

Techniques for reducing the strength of the bond between cured material and a contact surface may include inhibiting the curing process or by making a highly smooth contact surface. In many use cases, however, at least some force must be applied to remove the cured photopolymer layer from the contact surface. For example, a force may be applied by rotating the container to mechanically separate the container from the part 112. FIG. 1C depicts exemplary stereolithographic printer 100 separating a part from the container by pivoting the container 106 about a fixed axis 108 on one side of the container, thereby displacing an end of the container distal to the fixed axis a distance 118 (which may be any suitable distance). This step involves a rotation of the container 106 away from the part 112 to separate layer 116 from the container, which may be followed by a rotation of the container back towards the part. In addition, the build platform 104 may move away from the container to create a space for a new layer of liquid photopolymer to form between the part and the container. Subsequent to this motion, a new layer of liquid photopolymer is available for exposure and addition to the part being formed. Each step of the aforementioned curing and separating processes may continue until the part is fully created. By progressively separating the part and the container base, such as in the steps described above, the peak force and/or total force necessary to separate the part and container may be minimized.

Multiple problems may, however, arise due to the application of force to the part during the above-described processes. For example, in some use cases a force may be applied to and/or through the part itself. A force applied to the part may, in some use cases, cause the part to separate from the build platform, rather than the container, which may disrupt the fabrication process. In some use cases, a force applied to the part may cause deformation or mechanical failure of the part itself.

The inventor has recognized and appreciated that the above-described problems with the separation processes may be mitigated or eliminated by utilizing a flexible thin film as a contact surface. A flexible film can be arranged to be substantially flat during application of actinic radiation to a photopolymer, then subsequently deformed to separate the newly-cured material from the film. Due to the flexibility of the thin film, the forces required to separate the part from the film may be much lower than those experienced when separating a part from a rigid surface (e.g., as in the example of FIG. 1C). According to some embodiments, the thin film may be anchored at multiple points around its perimeter and thereby suspended over an opening.

The inventor has further recognized and appreciated that, to be suitable for use in additive fabrication, it is desirable that a thin film exhibit a number of properties to be described below. First, it is desirable that the film has sufficient mechanical strength to experience repeated deformations without suffering significant structural damage. Second, it is desirable that the film exhibits some permeability to photopolymer curing inhibitors, such as oxygen. Materials having this property have been found to inhibit photopolymer curing at their surface, which reduces the forces between cured photopolymer layers and the surface due to reduced curing at the interface. Third, it is desirable for implementations in which actinic radiation is directed through the contact surface that the thin film be transparent to the actinic radiation.

The inventor has further recognized and appreciated that there are few materials that exhibit this particular combination of qualities. For instance, materials in the Teflon® family, or other polytetrafluoroethylene-based formulae, may in some cases be utilized to construct a thin film. While, however, such materials may have the mechanical properties that allow production of flexible thin films, they also provide only limited oxygen diffusivity and limited actinic transparency. Additionally, products in the above categories may not be cost effective in the desired quality.

The inventor has further recognized and appreciated that a composite material comprising at least two materials may exhibit the desirable properties of mechanical strength, optical transmissivity and permeability to inhibitors, even though no constituent material may alone exhibit all of these properties. For instance, a non-flexible material may be integrated with a flexible material to produce a flexible composite material. These techniques allow for the consideration of materials for use in a thin film in additive fabrication that may otherwise not be considered due to them lacking one or more of the above-discussed desirable properties.

According to some embodiments, part or all of the interior surface of a vessel that holds a liquid photopolymer may be formed from a thin film produced from a composite material. Using a flexible, thin film as at least part of the interior surface of the vessel may decrease the overall force applied to a part being formed by allowing a peeling edge to propagate inward from most or all of the outer edge of the contact area between the part and the film, rather than from a discrete number of sides. The thin film may be configured to behave like a thin sheet, rather than a rigid or flexible beam (e.g., the container 106 described above in the example of FIGS. 1A-1C behaves like a flexible beam). The thin film may be separated from the part via active and/or passive means. For example, an active means may pull on the thin film to initiate and/or propagate a peeling edge. Alternatively, or additionally, a passive means, such as a motion of the build platform, may be performed to initiate and/or propagate peeling of the film from the part.

According to some embodiments, the composite material may comprise first and second materials wherein the first material possesses superior mechanical properties, such as a higher tensile strength, than the second material, while the second material may possess other advantageous properties, such as superior optical transmissivity and/or curing inhibitor (e.g., oxygen) permeability than the first material. The combination of the two materials may thereby provide a set of desirable properties as outlined above. Such a composite material may include any number and type of materials in addition to the first and second materials outlined above.

According to some embodiments, a thin film utilized as a contact surface in an additive fabrication device may be formed from a composite material in which a plurality of discrete pieces of a first material are embedded within a second material. The pieces of the first material could be, for example, spheres, fibers, tubes, rods, etc. at any suitable scale, such as microspheres, microfibers, etc. or nanotubes, nanorods, etc. Such a composite material may exhibit permeability to curing inhibitors, such as oxygen, commensurate to that of the second material, if the discrete pieces of the first material are suitably sparsely arranged so as not to alter the permeability of the second material. Moreover, this composite may have a greater mechanical strength than would the second material alone, since the first material may provide additional mechanical strength if it has, say, a higher tensile strength and/or higher elastic modulus that the second material. Finally, the composite may be actinically transparent where both the first material and second material are actinically transparent. The composite may also not significantly diffuse light if the refractive indexes of the first material and the second material are substantially similar.

According to some embodiments, the composite material may comprise a fibrous material consisting of fibers that are randomly aligned or are structured in various ways, including substantially linear, crosshatched, or woven. Said fibrous material may advantageously consist of at least one ply of fibers. In some embodiments, the layout, density, and configuration of the fibrous material may be uniform.

According to some embodiments, a composite material in which a plurality of discrete pieces of a first material are embedded within a second material may exhibit random or non-random alignment of the pieces of the first material. A random alignment may produce a composite with substantially equal mechanical strength along any given axis parallel to the surface. Alternatively, when the pieces of the first material are predominantly aligned along one axis, this may produce different mechanical strengths parallel to that axis compared with the mechanical strength along other axes. A non-random or ordered alignment may be utilized to produce a thin film that is, for instance, more flexible in one direction than in another.

According to some embodiments, a composite material in which a plurality of discrete pieces of a first material are embedded within a second material may exhibit domains with different physical properties, such as but not limited to different mechanical properties. Each domain may vary layout, density, and/or configuration of the first material to vary the physical properties in different locations. The composite material may be manufactured, for example, with different number densities, fill factors, mass densities and/or alignments of the pieces of the first material in different regions to control how various physical properties vary across the surface of the composite material. For example, the density of the first material may be increased around the edges of a sheet of the composite material so as to increase tensile strength at attachment points and decrease the tensile strength in areas through with actinic radiation is expected to pass.

According to some embodiments, to inhibit undesirable diffraction of actinic radiation in a composite material, the constituent parts of the composite may have substantially similar refractive indexes. Ideally, the index of refraction of the components would match, but due to the thin thickness of the film and the degree of diffraction that could be tolerated in an additive fabrication device the indexes need not be identical so long as the resulting composite is substantially transparent in the utilized thickness. Particular examples are discussed further below, although generally the refractive index of all the constituent components of a composite material may differ by between 0% and 20%, or between 0% and 10%, or between 0% and 5%.

According to some embodiments, a thin film formed from a composite material may have a surface layer applied to it that increases the substances with which the thin film is compatible. For instance, the composite material may have a tendency to undergo undesirable reactions or alterations when exposed to certain substances. In this way, the composite material is said to be incompatible with these substances. As such, the surface layer may be selected to be a material that is compatible with such substances whilst maintaining the other desirable properties of the composite material, such as transparency to actinic radiation and permeability to curing inhibitors. As discussed in U.S. Provisional Patent Application No. 62/419,375, filed on Nov. 8, 2016, titled "Multi-Material Separation Layers for Additive Fabrication," the contents of which are hereby incorporated by reference in their entirety, one example of a suitable material for such a surface layer is polymethylpentene (PMP).

Following below are more detailed descriptions of various concepts related to, and embodiments of, systems and methods for separating a part from a surface during additive fabrication. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the Form 1+3D Printer sold by Formlabs, Inc., the Assignee of the present application, and with respect to stereolithography, the techniques described herein may be equally applicable to other systems, including digital light processing (DLP) systems and/or any other system in which solid material is produced in contact with a surface other than previously-produced solid material or a build surface. In some embodiments, structures fabricated via one or more additive fabrication techniques as described herein may be formed from, or may comprise, a plurality of layers. For example, layer-based additive fabrication techniques may fabricate an object by forming a series of layers, which may be detectable through observation of the object, and such layers may be any size, including any thickness between 10 microns and 500 microns. In some use cases, a layer-based additive fabrication technique may fabricate an object that includes layers of different thickness.

Figure 2:
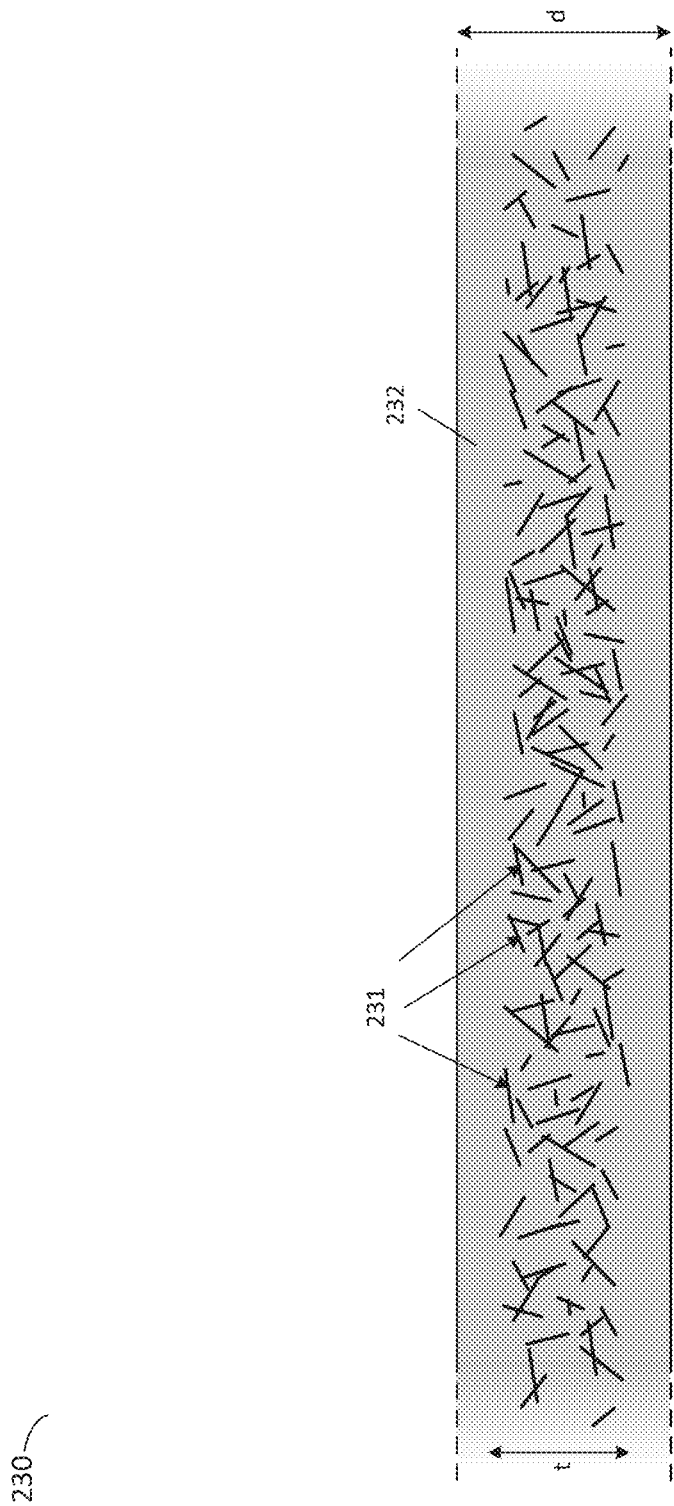
FIG. 2 illustrates a composite material suitable for use as a contact surface, according to some embodiments.

FIG. 2 illustrates a composite material suitable for use as a contact surface, according to some embodiments. The composite material 230 is an example of a composite material in which fibers of a first material have been embedded in a second material. As described above, this combination may produce a composite material having desirable mechanical properties, a desirable level of permeability to curing inhibitors and transparency to actinic radiation, even though neither the first material or the second material may individually exhibit all of these properties.

In the example of FIG. 2, a plurality of unwoven, unordered fibers of a first material are arranged in a layer (or "ply") having thickness t within a layer of a second material 232 having thickness d. Illustrative fibers 231 are shown in the figure. A cross-section through the resulting composite material is shown in the figure. It will be appreciated that the fibers may be randomly oriented in any direction, including directions through the plane of the illustrated cross-section.

In some use cases, the thickness of the second material 232 may be substantially the same thickness as the ply of the fibrous material. That is, the thickness d may be equal to, or approximately equal to, t. Alternatively, the second material may be thicker than the first material as shown in FIG. 2, where d>t.

According to some embodiments, suitable thickness of the composite 230 to be used as thin film in an additive fabrication device include thicknesses d between 50 µm and 500 µm, or between 75 µm and 300 µm, or between 100 µm and 200 µm, or between 50 µm and 150 µm, or less than 300 µm.

In some embodiments, the first material may be a nonwoven fiberglass material known as fiberglass tissue, sometimes referred to as fiberglass veil. Said fiberglass tissue is a non-woven fiberglass material with glass fibers bonded together in a random fiber matrix, substantially having one ply with a low density of fibers. In some embodiments, said fiberglass tissue may have a thickness t between 25 µm and 500 µm, or between 25 µm and 250 µm, or between 50 µm and 300 µm, or between 75 µm and 150 µm, or less than 300 µm.

According to some embodiments, where the first material is a nonwoven fiberglass material, the fibers may have a density of between 0.1 ounces and 0.5 ounces per square yard (e.g., 0.3 ounces per square yard), but other embodiments may consist of thicker and/or heavy weight fiberglass tissue, the weight of the square yard being in part an indirect measurement of the density of fibers per square yard. In general, however, it may be advantageous to select the thinnest and lightest fiberglass tissue capable of providing sufficient mechanical strength to the resulting composite film.

In some embodiments, the first material may include a plurality of different fibrous materials, such as the aforementioned nonwoven fiberglass, non-woven high density polyethylene (such as commonly available as Tyvek), and/or woven materials, such as Type 304 Stainless Steel Wire Cloth with open areas of 50% or greater and wire diameters of 0.15" or less.

According to some embodiments, the second material 232 may comprise a polymer, a Teflon-like material, and/or a silicone rubber, such as polydimethylsiloxane (PDMS). For example, the second material 232 may comprise the PDMS formulation commercially available as Sylgard 184. As discussed above, the second material may advantageously allow for the ready permeability of oxygen and transmission of actinic radiation through the second material.

According to some embodiments, the oxygen permeability of the composite material 230 may be equal to, or approximately equal to, the oxygen permeability of the second material 232. For example, the oxygen permeability of the composite material 230 may be within 10%, within 5%, or within 2% of the oxygen permeability of the second material 232. According to some embodiments, the oxygen permeability of the composite material 230 is between 100 Barrer and 500 Barrer, or between 200 Barrer and 500 Barrer, or between 300 Barrer and 600 Barrer.

According to some embodiments, the fibers 231 in the composite material may be transparent to actinic radiation to be transmitted through the resulting composite material. However, the fibrous material may, in some embodiments, have less desirable optical properties than the second material of the composite. By minimizing the density and width of fibers to the minimum needed to provide mechanical reinforcement, these less desirable optical properties may be minimized.

According to some embodiments, it may be advantageous to select first and second materials so as to minimize differences between the refractive indexes of the first and second materials, so as to minimize the extent to which actinic radiation may be scattered within the thin film due to refractive effects. In many applications, however, the thin size of the film and/or proximity of the thin film to the active optical region of the photopolymer may cause scattering and refracting effects to be insignificant to (or to have a de minimis effect upon) the additive formation process, as scattered actinic radiation may diverge only slight distances from an ideal location before being blocked or otherwise absorbed within exposed photopolymer. For instance, the composite material 230 may diffuse actinic radiation propagating through the thickness direction by 5° or less.

Notwithstanding the above, it may nonetheless be beneficial to index match the first and second materials of composite 230 to some degree. For example, where the second material is PDMS, which has a refractive index of around 1.41, the refractive index of the first material may be between 1.3 and 1.6, or between 1.3 and 1.55, or between 1.35 and 1.55, or between 1.3 and 1.45, or between 1.35 and 1.45.

In some embodiments, the second material may be one that may be deposited in liquid form onto the first material in order to manufacture the composite material 232. For instance, the composite material may be formed by placing fibers of the first material into a layer of the second material that is in liquid form, then causing the second material to cure or solidify such that the first fibrous material is substantially contained within the second material, such as an embedded matrix.

FIG. 3 illustrates a stereolithographic printer having a composite thin film as a contact surface, according to some embodiments. In the example of FIG. 3, the composite material 232 is used as a thin film within additive fabrication device 300. The thin film 232 is anchored by supports 320 which suspend the film over an opening. Together, the thin film 230 and the anchors 320 form a vessel holding the photopolymer 310. A source of actinic radiation 322 may be applied through the thin film to cure regions of the photopolymer 310.

As discussed above, a thin film may be formed from a composite that exhibits different properties in different regions due to variations in the density, layout, etc. of the component materials of the composite. As one illustrative example in the context of FIG. 3, the thin film 230 may be configured to be comparatively less flexible (more rigid) close to anchors 320 and comparatively more flexible in interior regions of the vessel formed by the thin film and the anchors. For instance, where the thin film is a composite formed from fibers embedded in a second material, the fibers may have a higher density around an exterior region of the thin film compared with the density in the interior region.

The anchors 320 may comprise a rigid material such as an acrylic. The thin film 230 may have any suitable thickness such that the film is thick enough to maintain structural integrity through the fabrication process and is thin enough to be easily removed from the part as described herein. In some embodiments, the thin film has a thickness between 50 µm and 500 µm, or between 75 µm and 300 µm, or between 100 µm and 200 µm, or between 50 µm and 150 µm, or less than 300 µm. The thin film 230 may be fixed to the anchors 320 or may be adjustably tensioned between them.

Once a layer of cured photopolymer has been formed in the example of FIG. 3, any combination of active and/or passive means, now known or later discovered, may be employed to separate the contact surface of the thin film from the cured photopolymer. In some embodiments, the build platform 304 may be moved up (i.e., away from the thin film), thereby flexing the thin film upwards at the region of contact, exerting a force on the region of contact, and eventually separating the part from the film. Equivalently, in some embodiments the vessel formed by the thin film 230 and the anchors 320 may be moved down (i.e., away from the build platform), thereby flexing the thin film downwards at its perimeter, exerting a force on the region of contact, and eventually separating the part from the film.

In some embodiments, the vessel formed by the thin film 230 and the anchors 320 may be moved laterally (e.g., parallel to the build surface of build platform 304), thereby applying a force against the region of contact between the thin film and the cured photopolymer substantially parallel to the surface of the photopolymer, and eventually separating the part from the film. It will be appreciated that any suitable combination of the above techniques to perform separation of the thin film 230 from the cured photopolymer may also be employed (e.g., lateral motion of the vessel simultaneously with vertical motion of the build platform).

According to some embodiments, separation of the thin film 230 from the cured photopolymer may utilize a wiper that applies additional forces to the region of contact to aid in separation. Separation that includes forces applied by such a wiper may, or may not, also simultaneously or sequentially apply one or more of the above-discussed means for separation.

Figure 4A:
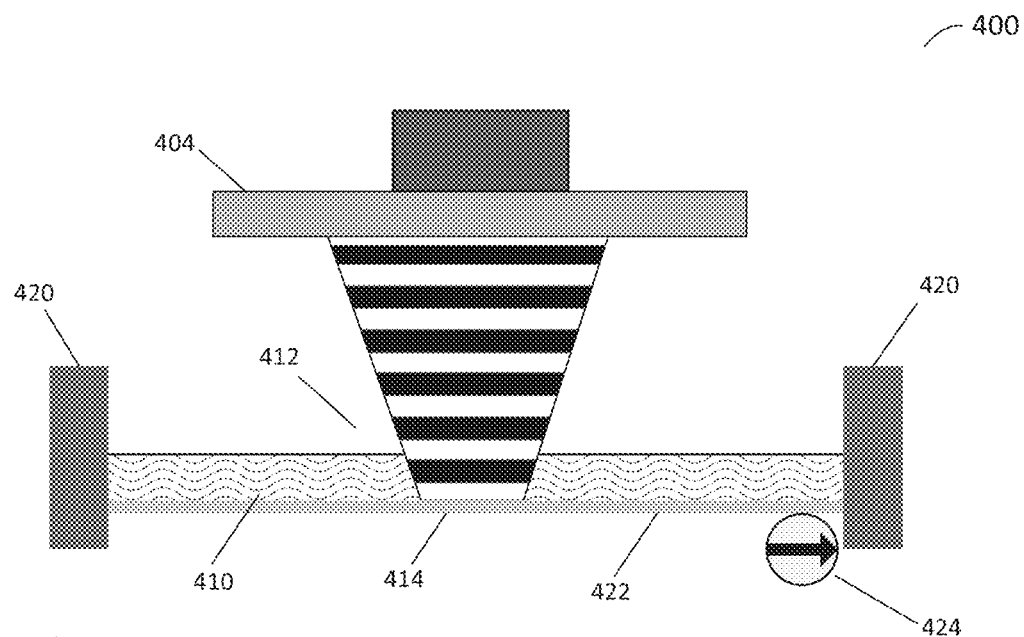
FIGS. 4A-C depict an illustrative active separation operation of a stereolithographic printer utilizing a composite thin film, according to some embodiments.
Figure 4B:
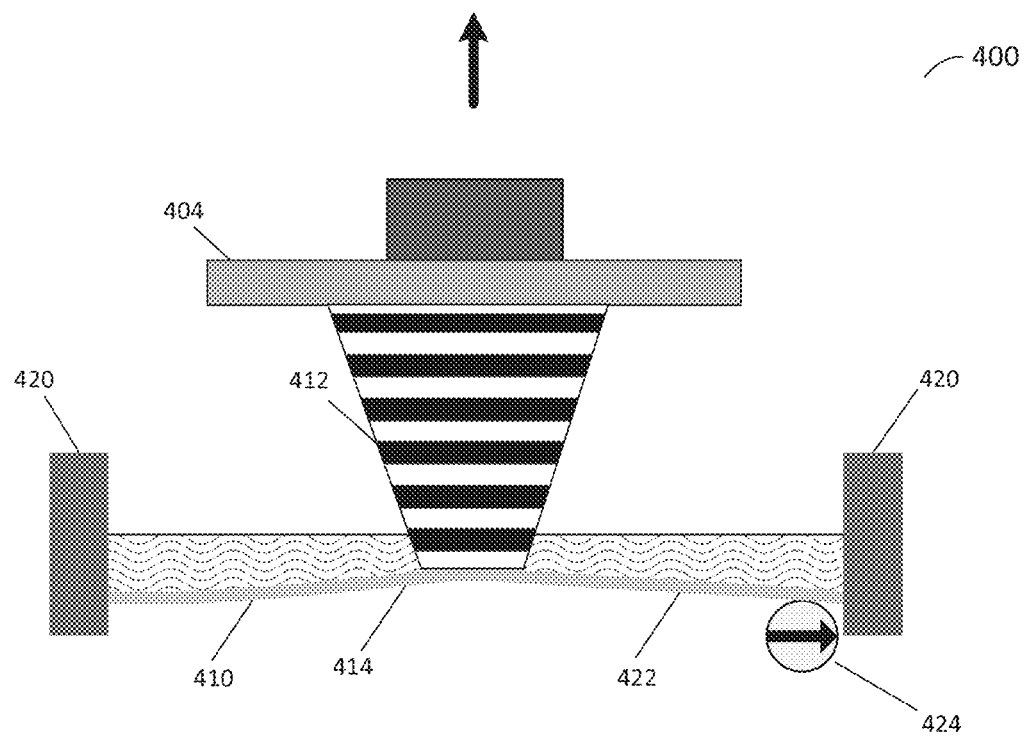
Figure 4C:
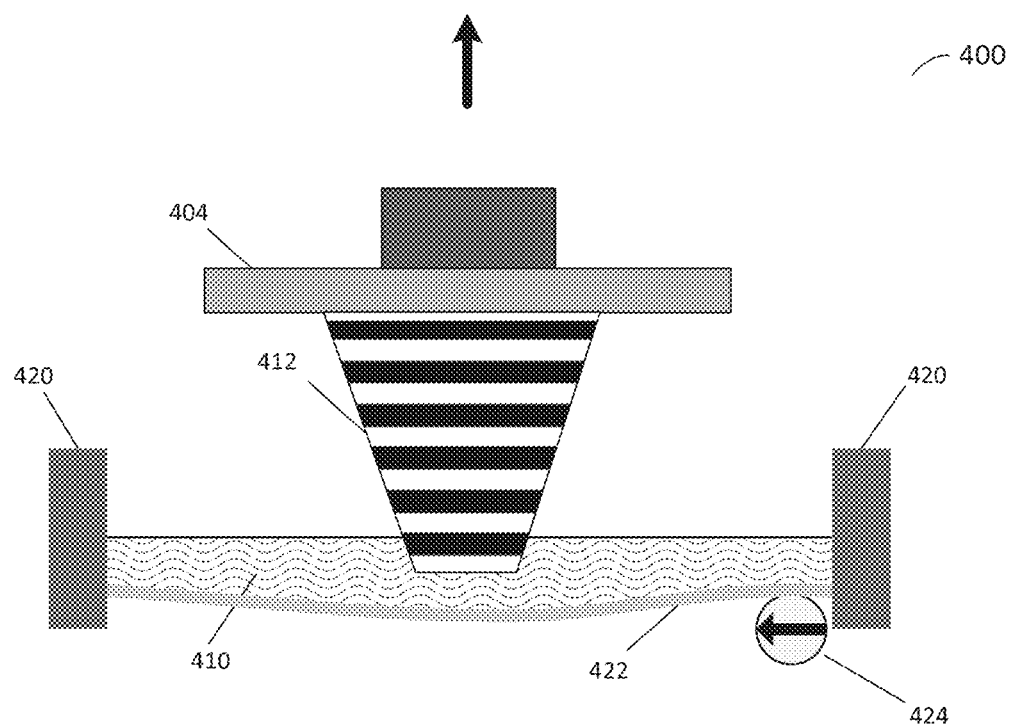

FIGS. 4A-C illustrate a process of separating a thin film from a region of cured photopolymer by an additive fabrication device that includes a wiper, according to some embodiments. Illustrative additive fabrication device 400 includes a vessel formed from a thin film 422 and anchors 420, which holds photopolymer 410. Thin film 422 may be formed from a composite material as discussed above.

Illustrative additive fabrication device 400 may further include a wiper 424, which may include wipers disclosed in U.S. patent application Ser. No. 14/462,551, titled "Improved Peel for Stereolithography," filed on Aug. 18, 2014, the contents of which are hereby incorporated by reference in their entirety. The wiper may move across the lower surface of the flexible film to aid in separation of the film from the part.

As shown in FIG. 4A, a layer of cured photopolymer 414 of a part 412 may adhere to the flexible floor of the container 422 during the fabrication process. As shown in FIG. 4B, the build platform and part may be lifted upward with adhesion forces causing the film 422 to deform. The flexible film 422 may be able to deflect upward with the part until the necessary separation force is generated by the upward movement of the part and the downward pull of the container floor. A mechanical peel may then begin at the outer edges of the part and propagates inward until the part is separated, as shown in FIG. 4C.

According to some embodiments, a mechanical peel operation, including those utilizing a wiper such as wiper 424 may be controlled by one or more computing devices having one or more processors. The computing device may comprise instructions that, when executed, cause an additive fabrication device (e.g., device 100 and/or 400) to perform a mechanical peel operation. Such an operation may comprise: moving a build platform toward and/or away from a newly formed layer, rotating a container in which a photopolymer is located (e.g., container 422), and/or moving a wiper across the surface of a flexible film. The computing device may, for example, be housed within the additive fabrication device or may send instructions to perform operations to the additive fabrication device. Accordingly, such a computing device may provide automated operation of the additive fabrication device which may include automated peeling processes.

In some use cases, the use of the flexible thin film 422 may result in the weight of liquid photopolymer and force of the build platform and part to cause unwanted "sagging" deformation in the film. Such sagging may be partially addressed by the use of a wiper. In the example of FIGS. 4A-C, the wiper 424 traverses the underside of the film 422 after separation as shown in FIG. 4C, and lifts the film up towards the bottom of the part or build platform and so positions the film prior to each build layer to ensure a uniform thickness of liquid photopolymer between the build platform 404 and the vessel. According to some embodiments, the wiper 424 may move from one side of the vessel to the other while pushing the sag out of the film until it is sufficiently parallel to the surface of the build platform 404.

While the wiper 424 is depicted as a cylindrical roller in FIGS. 4A-4C, the wiper may be of any suitable shape and may progress across the film floor in any suitable way, such as from one side to the other, or in a coordinated pivoting motion like windshield wipers. Following this motion, a depth of photopolymer suitable for fabricating a layer of a part may be produced between the film and either the build platform 404, or after fabrication has commenced, the part 412. In some embodiments, the wiper may proceed below the film such that it accelerates smoothly with minimal frictional forces. Moving the wiper too slowly could allow the film 422 to sag again behind the wiper, but moving the wiper too quickly may cause undesirable friction as the blade accelerates. In some embodiments, the wiper speed may be between 65 mm/s and 75 mm/s.

While embodiments of the present invention may be particularly advantageous for application as thin films, other applications in connection with stereolithographic additive manufacturing may also be possible. As an example, traditional applications of PDMS, such as thicker layers used to coat tank carriers materials, may also be enhanced with the introduction of fibrous materials in order to increase or otherwise modify the material properties of the PDMS.

Various inventive concepts may be embodied as one or more methods, of which examples have been provided. For example, methods of separating a part from a surface during additive fabrication have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques of separating a portion of a part formed through additive fabrication from a surface were described. These techniques may be applied in other contexts. For example, any additive fabrication process in which a portion of a part being formed becomes in any way attached to a surface other than another portion of the part or a build platform may utilize techniques as described herein. Such modifications and improvements are intended to be within the spirit and scope of the invention. Accordingly, the foregoing description is by way of example only, and is not intended as limiting.

What is claimed is:

1. A method of additive fabrication wherein a plurality of layers of material are formed on a build platform, the method comprising:
    forming a layer of material in contact with a substrate and further in contact with either a previously formed layer of material or the build platform by directing a source of actinic radiation onto a liquid photopolymer held by a container, the container comprising the substrate,
        wherein the substrate is transparent to the actinic radiation, is flexible, and is a composite material comprising a ply of non-woven fibers of a first material bonded together in a random fiber matrix and embedded in an elastomeric material, wherein the substrate has a thickness between 50 μm and 500 μm, wherein the ply of non-woven fibers has a thickness between 25 μm and 500 μm, and wherein the thickness of the substrate is greater than the thickness of the ply of non-woven fibers; and subsequent to the forming of the layer of the material, actively separating the layer of material from the substrate.

2. The method of claim 1, wherein the first material and the elastomeric material have substantially the same index of refraction.

3. The method of claim 1, wherein the ply has a thickness less than the thickness of the substrate.

4. The method of claim 1, wherein the non-woven fibers of the first material are glass fibers.

5. The method of claim 1, wherein the elastomeric material is polydimethylsiloxane (PDMS).

6. The method of claim 1, wherein the fibers are predominantly aligned along a first axis that is parallel to a surface of the substrate.

7. The method of claim 1, wherein the substrate has a thickness of between 50 μm and 200 μm.

8. The method of claim 1, wherein the substrate is suspended over an opening opposing the build platform.

9. The method of claim 1, wherein the substrate has an oxygen permeability that is within 5% of the elastomeric material's oxygen permeability.

10. An additive fabrication device, the device comprising:
a build platform coupled to one or more actuators configured to move the build platform in a vertical direction, the build platform having a build surface that is planar in a horizontal direction;
a vessel having an interior surface of which at least a portion is formed from a flexible composite material comprising a ply of non-woven fibers of a first material embedded in an elastomeric material,
wherein the composite material has a thickness between 50 μm and 500 μm,
wherein the ply of non-woven fibers has a thickness between 25 μm and 500 μm, and
wherein the thickness of the composite material is greater than the thickness of the ply of non-woven fibers; and
a source of actinic radiation arranged to direct actinic radiation through the composite material onto the build surface,
wherein the composite material is transparent to the actinic radiation.

11. The additive fabrication device of claim 10, further comprising one or more actuators configured to move the vessel in the horizontal direction.

12. The additive fabrication device of claim 10, further comprising a wiper configured to move across an exterior surface of the vessel whilst contacting the exterior surface, the exterior surface being opposed to the interior surface.

13. The additive fabrication device of claim 10, wherein the first material and the elastomeric material have substantially the same index of refraction.

14. The additive fabrication device of claim 10, wherein the vessel is coupled to one or more actuators configured to move the vessel in the horizontal direction.

15. The additive fabrication device of claim 10, wherein the ply has a thickness less than the thickness of the substrate.

16. The additive fabrication device of claim 10, wherein the non-woven fibers are glass fibers.

17. The additive fabrication device of claim 10, wherein the elastomeric material is polydimethylsiloxane (PDMS).

18. The additive fabrication device of claim 10, wherein the composite material has a thickness of between 50 μm and 200 μm.

19. The additive fabrication device of claim 10, wherein the composite material is suspended over an opening opposing the build platform.

* * * * *